United States Patent [19]
Ong et al.

[11] Patent Number: 5,952,994
[45] Date of Patent: Sep. 14, 1999

[54] METHOD FOR SCALING AN IMAGE

[75] Inventors: Joon-Suan Ong; Jin-Fye Leong, both of Singapore, Singapore

[73] Assignee: Hewlett-Packard Company, Palo Alto, Calif.

[21] Appl. No.: 08/904,103

[22] Filed: Jul. 31, 1997

[51] Int. Cl.[6] .................................................. G09G 5/00
[52] U.S. Cl. ........................ 345/127; 345/439; 345/508
[58] Field of Search .................................... 345/127, 129, 345/130, 439, 508, 511

[56] References Cited

U.S. PATENT DOCUMENTS

| | | | |
|---|---|---|---|
| 5,301,265 | 4/1994 | Itoh | 345/439 |
| 5,784,047 | 7/1998 | Cahill, III et al. | 345/127 |
| 5,793,379 | 8/1998 | Lapidous | 345/439 |
| 5,838,297 | 11/1998 | Zhao | 345/127 |
| 5,886,682 | 3/1999 | Biggs | 345/127 |

*Primary Examiner*—Bipin H. Shalwala
*Assistant Examiner*—Kent Chang

[57] ABSTRACT

A method for scaling a portion of an image shown on the display of a PDA is disclosed. After scaling, the display of the PDA switches to show the scaled view of the portion of the image. This method essentially involves the scaling of a first set of display information which forms the portion of the image, into a second set of display information which makes up the scaled view. During the scaling process, a series of look-up tables containing display conversion information are generated. An address-indexing technique is then used with the look-up tables to achieve an efficient and fast scaling process. The method also employs a smoothing technique to provide a more pleasing scaled view.

15 Claims, 6 Drawing Sheets

METHOD FOR SCALING AN IMAGE

FIELD OF THE INVENTION

The present invention relates generally to the sizing of an image shown on a display. In particular, it relates to a method for scaling an image by a scale factor and generating a scaled image for display on a display device.

BACKGROUND OF THE INVENTION

With an increase in demand for handheld devices that feature computing, telephony, faxing and networking capabilities, that players in the industry move to supply better handheld devices at competitive prices is inevitable. For example, a Personal Display Assistant (PDA), which is a type of pen-based handheld device that may function as a cellular phone, fax sender and electronic personal organizer, is a common product offered in the marketplace. Some of these PDAs are controlled by operating systems (OS) which have graphics routines to generate and display graphics and text images of varying sizes. These PDAs, however, usually come with small Liquid Crystal Display (LCD) screens. Due to the small display area of these LCD screens, the displayed images will consequently appear very small and, therefore, can be difficult to view.

Since these LCD screens with small display areas have display resolutions of 640×240 pixels, each of these pixels will therefore have a viewing dot of small size and pitch. In addition, LCD screens have poorer viewing contrast compared with Cathode Ray Tube (CRT) monitors. Text images appearing on such small LCD screens, especially those with small font sizes, therefore are extremely difficult to read. A simple solution to this reading problem would be to enlarge, or zoom into, a window, or a part, of the text image. Such a solution can be implemented using known software or software-plus-hardware scaling techniques.

Conventional PDAs come with monochrome displays which apply a simple software-based bitmap scaling technique. Such a technique, however, produces unsatisfactory visual effects such as an increase in aliasing, which has the effect of increasing the jagged, or stairsteps-like, appearance of the diagonal edges of graphics or text images. For example, the slanting edges of a black letter "A" on a white background, when stretched vertically and horizontally using the simple conventional software-based bitmap scaling technique, may become more jagged and uneven. Designing better text fonts for use with the conventional PDAs is often the only solution to alleviate the problem of increased aliasing caused by the conventional software-based bitmap scaling technique.

Scaling techniques that involve software control and hardware resources are generally more complicated and thus are not cost-effective implementations. Unless the OS or hardware of the PDA can support such scaling operations, the conventional software-based bitmap scaling technique is usually a preferred option.

With the introduction of more advanced grayscale displays for use with PDAs, the appearance of scaled images on these displays can be improved. The effect of aliasing can also be reduced during the scaling operation by applying smoothing techniques, which generally involve steps to smooth out the jagged slanting edges. The generation of a smoothed scaled image, however, can be a computationally expensive task and, therefore, time consuming. Since near real-time performance is often desired of any scaling operation, it is inevitable that a scaling technique which uses minimal computational resources is sought.

The present invention provides a solution to various prior art deficiencies, which include those present with the conventional software-based bitmap scaling technique described in the preceding paragraphs, to provide a cost effective and fast image scaling method.

SUMMARY OF THE INVENTION

The present invention provides a method of scaling a preselected portion of an image which is stored in an image buffer as a series of image data. As a result, a scaled image is generated and stored in a scaled image buffer as a series of scaled image data. The series of scaled image data are subsequently read, and the scaled image shown on a display device.

The method involves the initial step of assigning memory blocks for use as the scaled image buffer and a series of look-up tables. A series of table data are then generated by using the different possible values of the image data. Each of these table data is stored in one of the look-up tables at an address location indexed by the value of the corresponding image data. The display device is subsequently directed to read from the scaled image buffer.

After the look-up tables are generated, the scaled image buffer is filled with the series of scaled image data which are converted from a series of table data. These table data are retrieved from the look-up tables by using the corresponding series of image data which form the preselected portion of the image as address indices. The display device then shows the scaled image stored in the scaled image buffer.

DESCRIPTION OF THE PREFERRED EMBODIMENT OF THE INVENTION

OVERVIEW

Figure 1:
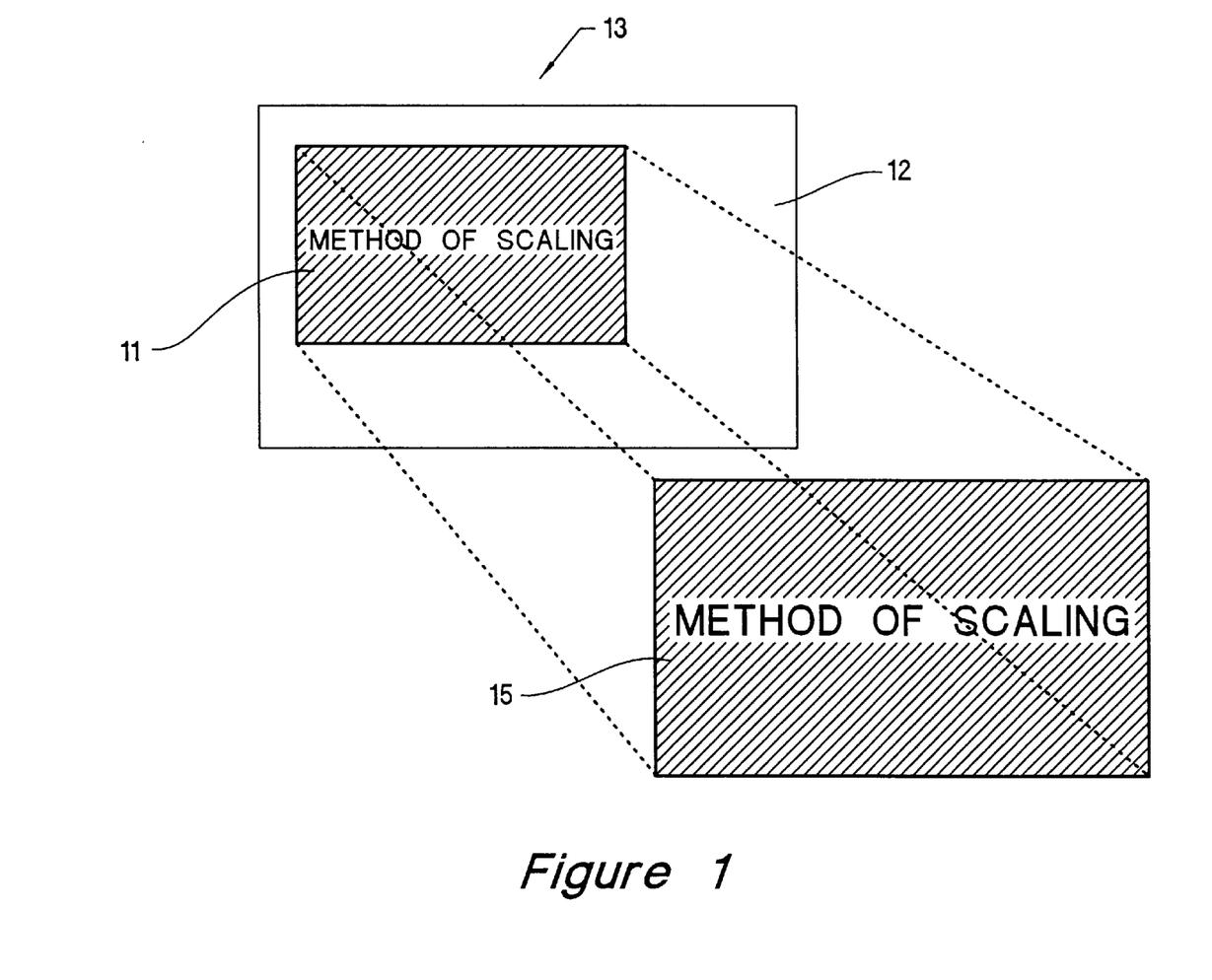
FIG. 1 illustrates a scaling operation using the preferred embodiment of the invention.

A preferred embodiment of the invention, as a solution to the foregoing prior art deficiencies, will be described in the ensuing paragraphs as a method of scaling a preselected portion 11 of an image 12 shown on an LCD screen 13 during a scaling operation, as illustrated in FIG. 1. The LCD screen 13 subsequently displays a scaled image 15 in place of the image 12. Typically, the LCD screen 13, an LCD controller and a Direct Memory Access Controller (DMAC) collectively form a display device. This display device, in return, forms a display sub-system of a PDA handheld device (not shown) together with other resources that will be described in later paragraphs.

Essentially, a graphics routine in the OS of the PDA writes display information into an image buffer (not shown). This display information is then showned on the LCD screen 13. When the LCD screen 13 switches to display the scaled image 15, however, the graphics routine continues to write the display information into the image buffer as if the LCD screen 13 is displaying the image 12. Thus, what is displayed on the LCD screen 13 as a consequence of the scaling operation is transparent to the OS. This transparency is important in order for the scaling operation to be independent of the OS.

Calling a scaling routine, which performs a novel scaling process, activates the scaling operation thereby triggering several events. Firstly, the display information which forms the scaled image 15 will be generated from the display information which forms the preselected portion 11 of the image 12 and stored in a scaled image buffer (not shown). At the same time, the display device 13, which originally reads from the image buffer, will be re-programmed to read from the scaled image buffer in order for it to display the scaled image 15. Subsequently, the display device 13 will continue to read periodically from the scaled image buffer until the scaling operation is deactivated. In addition, the display information residing in the image buffer and forming the preselected portion 11 of the image 12 is also periodically checked for changes. If there are changes, corresponding changes will also be made to the scaled image 15 stored in the scale image buffer.

SOFTWARE AND HARDWARE RESOURCES

Figure 2A:
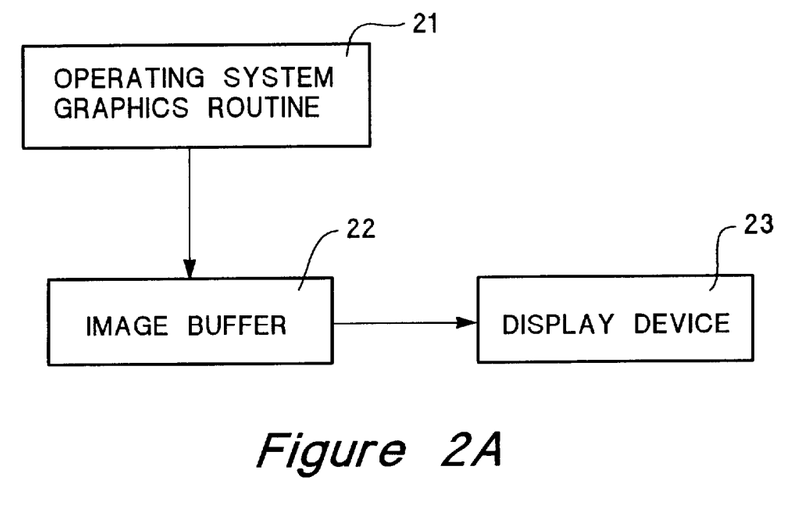
FIG. 2 is a data-flow diagram of the resources used in the embodiment of FIG. 1.
Figure 2B:
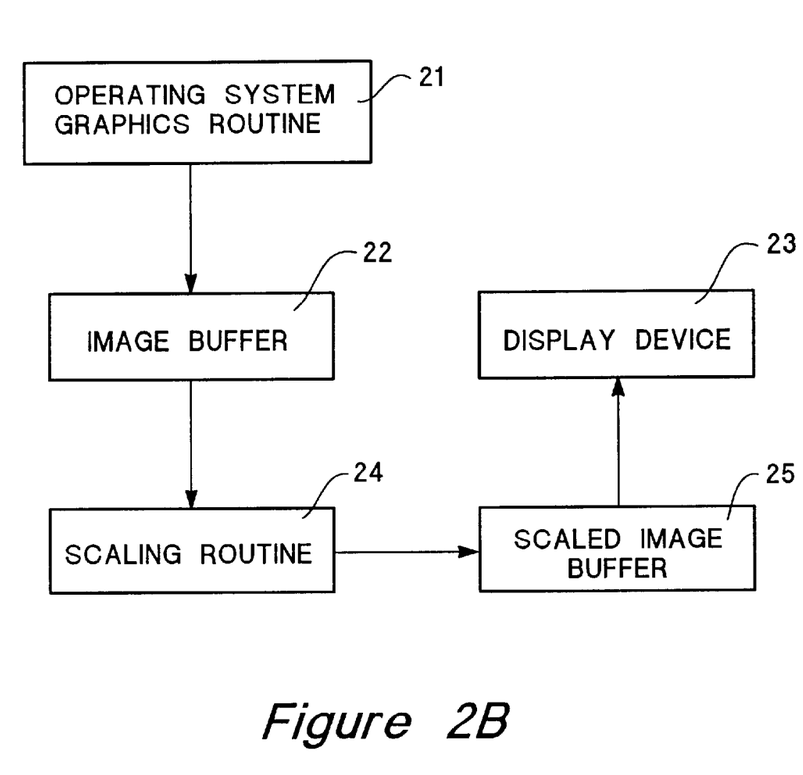

FIGS. 2A and 2B are block diagrams showing the data-flow among the software and hardware resources forming the display sub-system of the PDA during a normal display operation and the scaling operation respectively. During the normal display operation, as shown in FIG. 2A, the OS graphics routine 21 will generate the display information which is subsequently stored in the image buffer 22 residing in a read-write memory of the PDA. The display information stored in the image buffer 22 is periodically read, at a rate of 70 Hertz for example, by the display device 23, which displays the display information on the LCD screen 13 as an output for viewing.

In FIG. 2B, the data-flow path of the display information during the scaling operation is seen to be significantly different from the data-flow path shown in FIG. 2A. Essentially, the display information no longer flows directly from the image buffer 22 to the display advice 23, but is re-routed to a scaling routine 24. The scaling routine 24 then performs the novel scaling process, which will be described in further paragraphs, on part of the display information. The results of the novel scaling process are subsequently stored in the scaled image buffer 25. Finally, for the display information stored in the scaled image buffer 25 to be viewed on the LCD screen, the display device 23 is re-programmed to read the display information from the scaled image buffer 25. While the display information in the image buffer 22 is updated by the OS graphic routine 21, the display information in the scaled image buffer 25 is correspondingly updated by the scaling routine 24.

The rate at which the scaled image buffer 25 is updated by the scaling routine 24 is determined by the rate of change of the display information stored in the image buffer 22. The scaling routine 24 periodically checks the image buffer 22 after preparing and storing a first set of display information in the scaled image buffer 25. During these checks, the scaling routine 24 performs a checksum test pass on the display information of the preselected portion 11 of the image 12 stored in the image buffer 22. Upon detecting a discrepancy between the results of the current and last checksum test passes, the scaling routine 24 will update the display information in the scaled image buffer 25.

SEALING PROCESS FLOW

Figure 3:
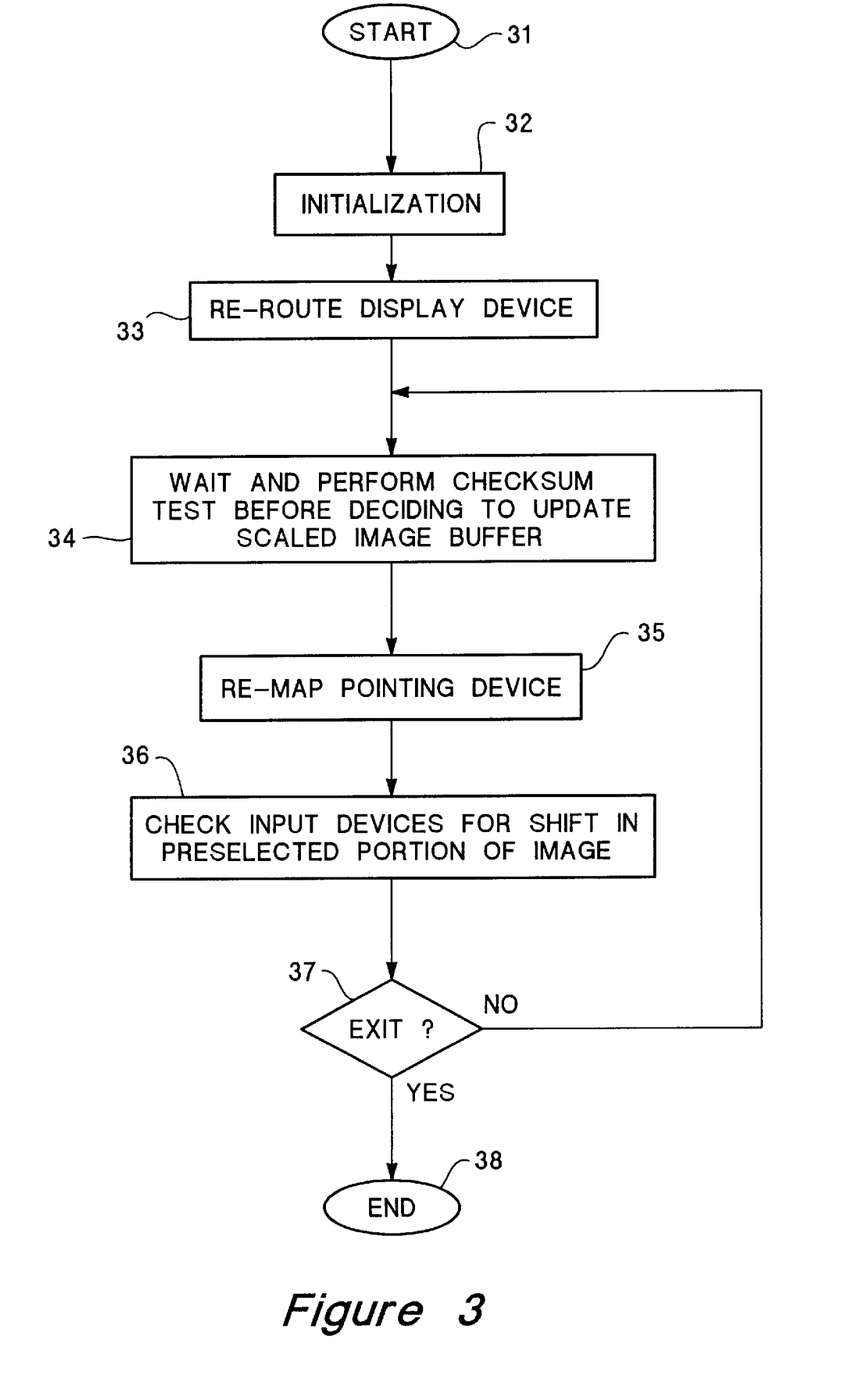
FIG. 3 is an operational flow chart of the embodiment in FIG. 1.

A flow chart of the scaling routine 24, which performs the novel scaling process during the scaling operation, is shown in FIG. 3. When the scaling operation is activated, the scaling routine 24 enters a start state 31. The scaling routine 24 then immediately enters an initialisation state 32, where the scaling operation is initialised. This initialisation includes allocating a block of contiguous memory for use as the scaled image buffer 25. The initialisation also includes the generation of a set of display conversion information in the form of look-up tables, which will be stored in the read-write memory.

When the initialisation state 32 is completed, the scaling routine 24 enters a display re-route state 33, where the scaling routine 24 re-programs the display device 23 to read from the scaled image buffer 25 instead of the image buffer 22. As mentioned in preceding paragraphs, the re-routing of the display information does not affect the operation of the OS graphics routine 21.

The scaling routine 24 subsequently enters a checksum test state 34, where the scaling routine 24 waits for 50 ms for example, before performing the checksum test pass as described earlier. If changes have occurred in the display information of the preselected portion 11 of the image 12 stored in the image buffer 22, or a request is received from an input check state 36 to shift the preselected portion 11 of the image 12, the scaling routine 24 will perform updating activities. The updating activities involve the generation of the display information for storage in the scaled image buffer 25 by using the display conversion information generated in the initialisation state 32. The checksum test pass is skipped, however, during a first pass of the scaling routine 24, since the scaled image buffer 25 is required to be initialised with a first scaled image 15.

Once the scaling routine 24 leaves the checksum test state 34, the scaling routine 24 enters a pointer re-map state 35, where a pointing device, if any is connected to the PDA, is re-mapped. The re-mapping of the pointing device is necessary, for the display co-ordinates of the scaled image 15 are different from the display co-ordinates of the image 12.

After re-mapping the pointing device, the scaling routine 24 enters the input check state 36. In the input check state 36, the scaling routine 24 checks all the connected input devices of the PDA for a request to shift the preselected portion 11 of the image 12. In particular, a keyboard or the pointing device will be polled for such a request.

At the end of the pass from the start state 31 to input check state 36, the scaling routine 24 enters an exit check state 37, where the scaling routine 24 polls the input devices for an instruction to deactivate the scaling operation. If a request to deactivate the scaling operation is received, the scaling routine 24 will reset the resources described earlier and re-program the display device 23 to revert to reading the display information from the image buffer 22. Otherwise, the scaling routine 24 will loop to the checksum test state 34, and thus check for changes to the display information of the preselected portion 11 of the image 12 stored in the image buffer 22 at a rate of 20 Hertz (or every 50 ms), for example.

INITIALISING AND UPDATING THE SCALED IMAGE

The activities performed by the scaling routine 24, when it enters the initialisation state 32 and checksum test state 34, will be described in further details in the following paragraphs. The description will be specific for a 4:3 scaling process for illustrative purposes. As an example, a two-bits-per-pixel (2BP) gray scale device independent bitmapped (DIB) display device 23 will be described. The 4:3 scaling process essentially means that a set of three pixels which belong to the image 12 will be scaled to a corresponding set of four pixels which will form part of the scaled image 15. In like manner, a set of three bytes which come from the image 12 is scaled to a set of four bytes in the scaled image 15. For optimal usage of the data transfer resources and an optimal implementation of the scaling process, the 4:3 scaling process uses three bytes of the image 12 to generate four bytes of the scaled image 15. Hence for ease of explanation, every three bytes of the image 12 will be referred to as an image data, and every corresponding four bytes of the scaled image 15 as a scaled image data.

The 4:3 scaling process may involve a 4:3 horizontal scaling process, a 4:3 vertical scaling process, or a combination of the horizontal and vertical scaling processes. Thus the ensuing paragraphs are dedicated to descriptions of each scaling process as an independent scaling process so that they may be considered for implementation separately.

HORIZONTAL SCALING

During the initialisation of the 4:3 horizontal scaling process, several events which involve the read-write memory will occur. Firstly, the scaling routine 24 allocates a block of contiguous read-write memory for use as the scaled image buffer 25. Secondly, a series of look-up tables, each of which contains a set of display conversion information that is formed from a series of table data 41, are generated by the scaling routine 24. These look-up tables are subsequently stored in blocks of contiguous read-write memory.

Figure 4:
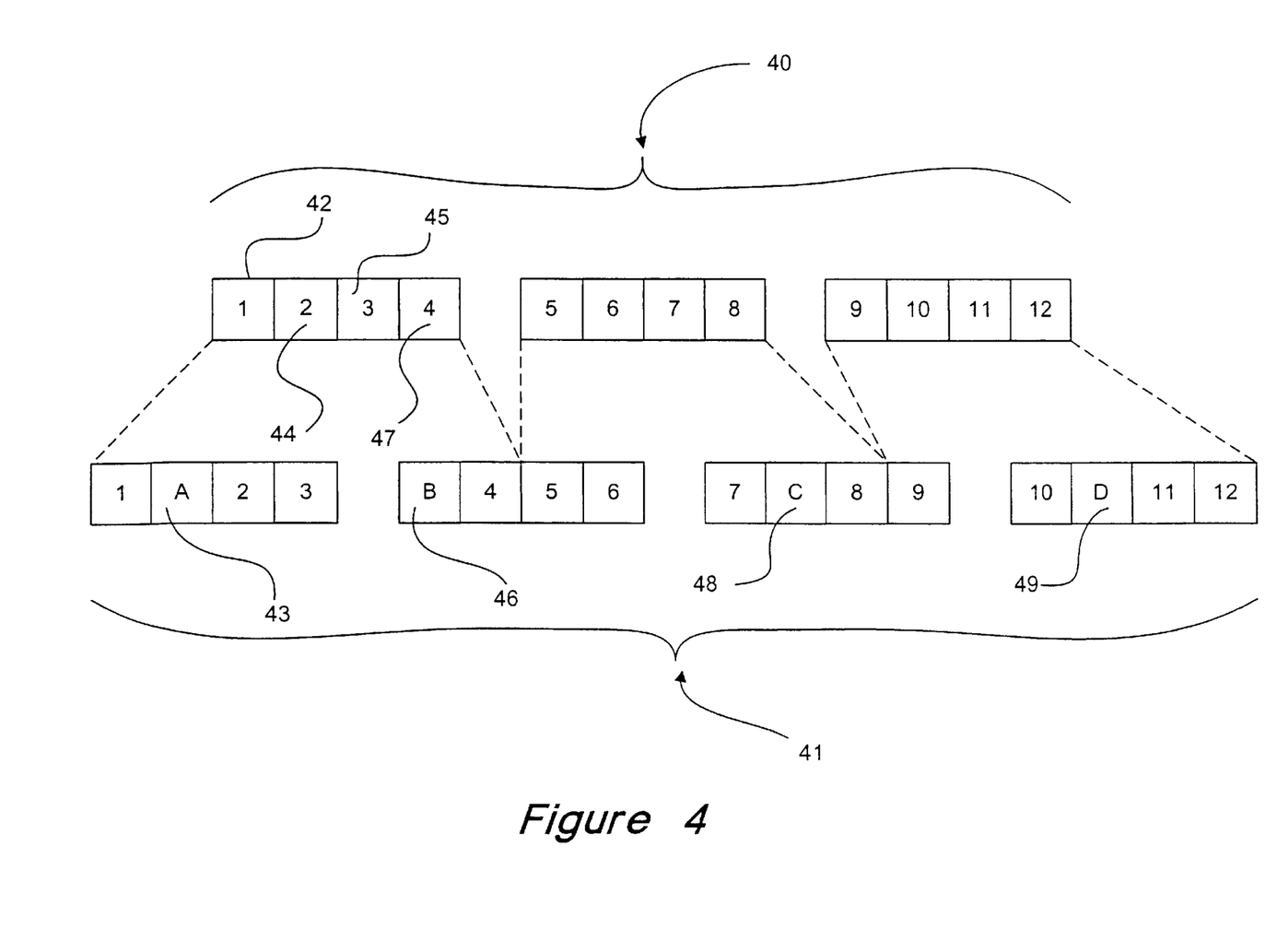
FIG. 4 is a diagram illustrating the pixel arrangement of an image data and the corresponding scaled image data during a 4:3 horizontal scaling operation.

The use of the image data 40 to generate the scaled image data 41, which will later be shown to comprise a set of table data ORed together, is shown in FIG. 4. Generally, each byte of display information comprises four pixels in the case of the 2 BP gray scale DIB LCD screen 13. Therefore, each image data 40 comprises twelve pixels which are displayed in a horizontal alignment in the image 12, and each scaled image data 41 consists of sixteen pixels which are horizontally aligned in the scaled image 15. Out of the sixteen pixels found in the scaled image data 41, twelve of them are duplicates of the twelve pixels found in the image data 40. The remaining four pixels, to be known as stretch pixels, therefore must be generated by the scaling routine 24. These stretch pixels, namely stretch pixels A 43, B 46, C 48 and D 49 of the scaled image data 41, are evenly spaced out among the twelve duplicate pixels. FIG. 4 also shows that each of the four stretch pixels A 43, B 46, C 48 and D 49 of the scaled data 41 is sandwiched between two duplicate pixels which are copied from adjacent pixels in the same byte of the image data 40. For example, the stretch pixel A 43 in the scaled image data 41 is sandwiched between the duplicate pixels of a first set of adjacent pixels 42 and 44 from the first byte of the image data 40. Similarly, the stretch pixel B 46 in the scaled image data 41 is sandwiched between the duplicate pixels of a second set of adjacent pixels 45 and 47 which are also from the first byte of the image data 40. The advantages of placing the stretch pixels A 43, B 46, C 48, and D 49 in these positions are manifold as shown in the following paragraphs.

By evenly spacing out the stretch pixels A 43, B 46, C 48 and D 49 among the twelve duplicate pixels in the scaled image data 41, the stretching effects of the scaling process are evenly spread throughout the scaled image 15. As a result, a more aesthetic view of the scaled image 15 is achieved. The stretch pixels A 43, B 46, C 48 and D 49, because of their positions within the scaled image data 41, are also generated in a way to achieve a smoothing effect on the scaled image 15. Each of the stretch pixels A, 43, B 46, C 48 and D 49 is generated by using the corresponding neighbouring duplicate pixels which are copied from adjacent pixels in the image data 40, where the display intensity gradient of these adjacent pixels is concerned. For example, the contrast caused by two adjacent pixels in the image data 40 having a large display intensity gradient is smoothed out if a stretch pixel of an intermediate display intensity is placed between the corresponding duplicate pixels in the scaled image data 41. The preferred implementation, in the scaling process, to achieve such a smoothing effect is to generate each stretch pixel in the scaled image data 41 by using the display intensity average of the corresponding neighbouring duplicate pixels.

Figure 5:
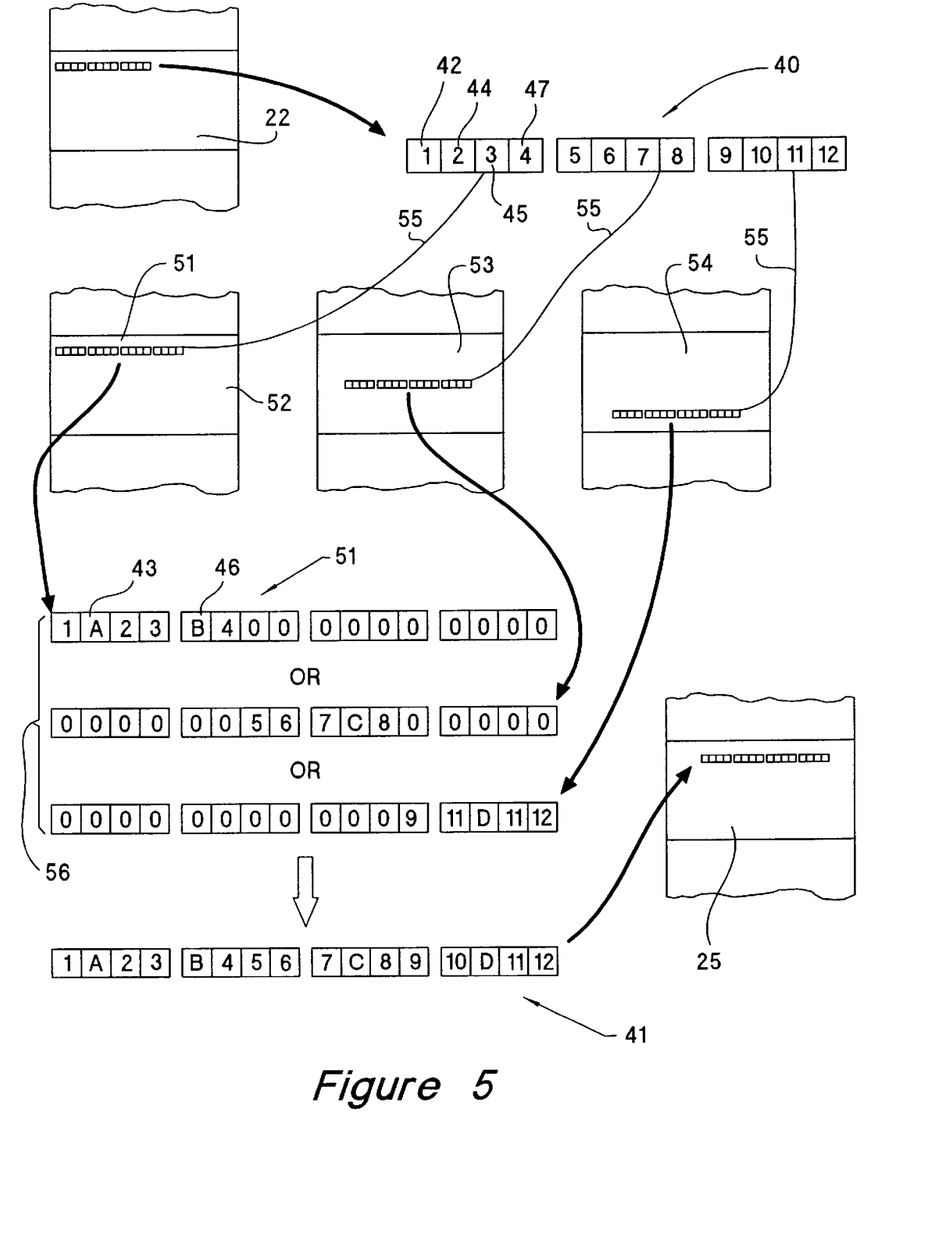
FIG. 5 is a data flow diagram illustrating the data flow between the read-write memory and the scaling routine during the process of updating the scaled image buffer for the 4:3 horizontal scaling operation.

The most important advantage of evenly spacing the stretch pixels A 43, B 46, C 48 and D 49 within the scaled image data 41, however, lies in the generation, the storage, and subsequently the access of the table data 51, as shown in FIG. 5. FIG. 5 illustrates the data flow, indicated by solid arrows, between the read-write memory and the scaling routine 24 during the process of updating the scaled image buffer 25. For every possible value of each byte of display information within the image data 40, a corresponding table data 51 is generated. For example, the first byte of the image data 40 comprising the first and second sets of adjacent pixels 42, 44, 45 and 47 is used to generate the table data 51 comprising the four duplicate pixels in addition to pixels A 43 and B 46. The rest of the table data 51 is stuffed with zero bits. Each of these table data 51 is subsequently stored in a read-write memory location, where the address is indexed by the value of the corresponding byte within the image data 40, as shown by dotted lines 55. Since there are three bytes of data in the image data 40, three look-up tables 52, 53 and 54 are subsequently generated during the initialisation of the 4:3 horizontal scaling process. In addition, each of the look-up tables 52, 53 and 54 contains 256X four bytes of table data 51, since there are $2^8$ or 256 possible values of each byte of display information within the image data 40.

After the initialisation of the 4:3 horizontal scaling process, the look-up tables 52, 53 and 54 are subsequently used for updating the scaled image 15 when the scaling routine 24 enters the checksum test state 34. Upon detecting a change in the image data 40 forming part or all of the preselected portion 11 of the image 12 during the checksum test pass, the scaling routine 24 will grab the image data 40 associated with the change. Using each byte of these image data 40 as an address index, the corresponding table data 51 is retrieved, as shown by the dotted lines 55. A set of three table data 56 which are retrieved using the corresponding three bytes of display information within each affected image data 40 are then ORed to give each scaled image data 41. These scaled image data 41 are subsequently stored into the scaled image buffer 25, which had earlier been allocated as a block of contiguous read-write memory.

VERTICAL SCALING

As in the case of the 4:3 horizontal scaling process, several events involving the read-write memory will occur during the initialisation of the 4:3 vertical scaling process. Firstly, the scaling routine 24 allocates a block of contiguous read-write memory for use as the scaled image buffer 25.

Figure 6:
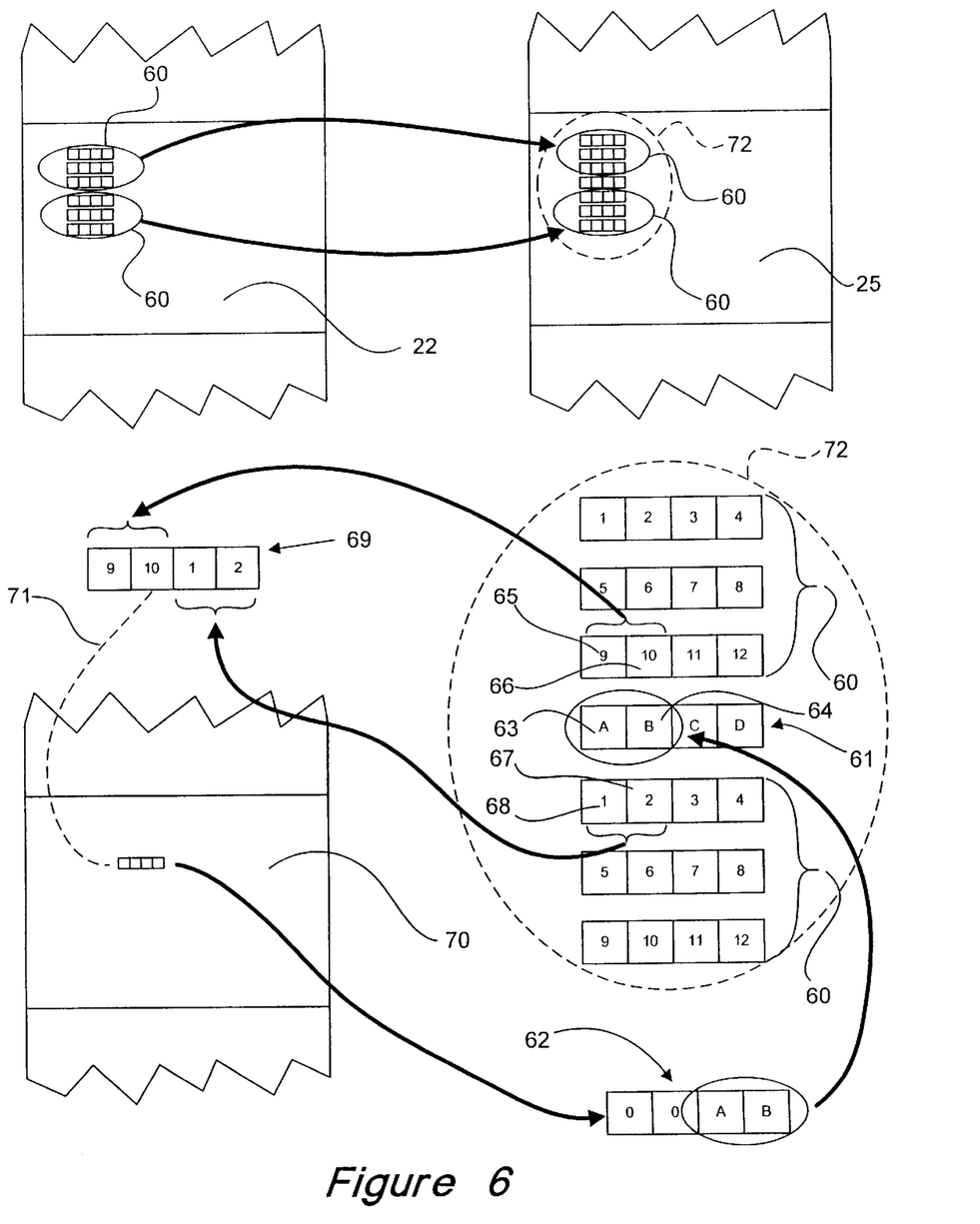
FIG. 6 is a data flow diagram illustrating the data flow between the read-write memory and the scaling routine during the process of updating the scaled image buffer for a 4:3 vertical scaling operation.

Secondly, a series of look-up tables, each of which contains a set of display conversion information that is formed from a series of table data 62, as shown in FIG. 6, are generated by the scaling routine 24. FIG. 6 illustrates the data flow, indicated by solid arrows, between the read-write memory and the scaling routine 24 during the process of updating the scaled image buffer 25. These look-up tables are stored in a block of contiguous read-write memory, As described in preceding paragraphs, the scaling routine 24 uses the image data 40 which consists of three bytes of horizontally aligned display information during the 4:3 horizontal scaling process. During the 4:3 vertical scaling process, however, the scaling routine 24 uses an image data 60 which consists of three bytes of vertically stacked display information. Therefore, the display information in the image data 60, which are grabbed from the image buffer 22 for use during the 4:3 vertical process, consists of three rows of four pixels taken from the image 12. Another difference which exists between these scaling processes lies in the display information found within the different scaled image data generated. During the 4:3 vertical scaling process, a fourth row consisting of four pixels is generated as a scaled image data 61, in contrast to the scaled image data 41 generated during the 4:3 horizontal scaling process, which consists of four stretch pixels evenly spaced out among the 12 duplicate pixels.

The scaled image data 61, which is generated during the 4:3 vertical scaling process, consists of four pixels sandwiched between the last byte of a top image data 60 and the first byte of a bottom image data 60, as shown in FIG. 6. For example, a pixel A 63 is sandwiched between a pixel 9 (65) of the last byte of the top image data 60 and a pixel 1 (67) of the first byte of the bottom image data 60. Similarly, a pixel B 64 is also sandwiched between a pixel 10 (66) of the top image data 60 and a pixel 2 (68) of the first byte of the bottom image data 60. To smooth out any large contrast between the display intensities of the last byte of the top image data 60 and the first byte of the bottom image data 60, the pixels A 63 and B 64 are also taken as the averages of the pixels 9 (65) and 1 (67), and pixels 10 (66) and 2 (68) respectively.

Due to the arrangement of the pixels within the scaled image data 61 in relation to the top and bottom image data 60, and for efficient generation of the table data 62, address indexing is used once again. The pixels A 63 and B 64 are thus stored as display information within the table data 62 in an address location in the read-write memory which is indexed by the value of a table index 69 formed from the combination of pixels 9 (65), 10 (66), 1 (67) and 2 (68). Essentially, the value of any pair of pixels stored as display information within the table data 62 is derived by averaging the first two pixels with the next two pixels of the table index 69. All the possible values of the table index 69 are considered during the preparation of the table data 62. This process therefore results in $2^8$ or 256 table data 62 to form the look-up table 70.

After the initialisation of the 4:3 vertical scaling process, the look-up table 70 is subsequently used for updating the scaled image 15 when the scaling routine 24 enters the checksum test state 34. The scaling routine 24 starts the checksum test state 34 by conducting the routine checksum test pass. When a change in the preselected portion 11 of the image 12 is detected, duplicates of the affected image data 60 are copied from the image buffer 22 into the scaled image buffer 25 to fill the first three rows of display information while leaving the fourth row of display information empty. Upon duplicating all the image data 60 affected by the change, the corresponding pixels of the image data 60 are grouped together to form the table index 69. This table index 69 is subsequently used as an index to access the table data 62, which is stored in the look-up table 70, as shown by a dotted line 71. The table data 62 is subsequently shifted and ORed with other corresponding table data 62 to fill the fourth row in the scaled image buffer 25.

In the event that both the horizontal and vertical scaling processes are activated simultaneously, the 4:3 horizontal scaling process will be performed first in the preferred embodiment. When the scaled image buffer 25 is filled with scaled image data 41, these scaled data 41 are subsequently processed as image data 60 to provide a final vertically scaled image buffer.

The preferred embodiment of the present invention described in the preceding paragraghs is not to be construed as limitative. For example, a 3:2 scaling operation can also be implemented using the methods as described. In general, an m:n scaling operation can be implemented without having to depart from the scope and spirit of the invention, in which n pixels of the image data are scaled to m pixels of the scaled image data. In another example, a four-bits-per-pixel gray scale display device may be used instead of the 2BP gray scale DIB display device. In a further example, the stretch pixels of the scaled image data may be generated by copying one of the two corresponding neighbouring duplicate pixels to achieve a shorter initialisation period during the scaling operation. On the other hand, the stretch pixels may be generated at sub-pixel levels using previously known methods to achieve an enhanced smoothing effect. In yet another example, the look-up tables may be predetermined and permanently stored and reside in a read-only memory. The initialisation state of the scaling process, in this case, will therefore exclude the generation of the set of display conversion information, and hence have a shorter initialisation period.

We claim:

1. A method for scaling a preselected portion of an image formed from a plurality of image data and generating a plurality of scaled image data to form a scaled image for display in a device having blocks of contiguous memory, the method comprising the steps of:

assigning a first memory block to be a look-up table for storing a plurality of table data;

assigning a second memory block to be a scaled image buffer for storing the plurality of scaled image data;

processing the image data to generate a plurality of table data;

storing the plurality of table data in the look-up table, whereby each table data resides in a memory address indexed by the value of the corresponding image data;

directing the device to read from the scaled image buffer;

accessing the plurality of table data from the look-up table, whereby the plurality of image data are used as address indices to locate the plurality of table data; and converting the plurality of table data into the plurality of scaled image data for storage in the scaled image buffer.

2. The method as in claim 1 further comprising the step of periodically checking for changes to the plurality of image data forming the preselected portion of the image.

3. The method as in claim 2 further comprising the steps of updating the scaled image buffer upon the detection of changes in the plurality of image data by:

accessing the plurality of table data from the look-up table, whereby the plurality of image data are used as address indices to locate the plurality of table data; and converting the plurality of table data into the plurality of scaled image data for storage in the scaled image buffer.

4. The method as in claim 1 for generating the plurality of scaled image data wherein the step of processing the plurality of image data further includes processing a plurality of n-pixel image data, wherein each image data comprises n pixels.

5. The method as in claim 4 wherein the step of converting the plurality of table data into the plurality of scaled image data is for a horizontal scaling operation.

6. The method as in claim 5 for generating the plurality of scaled image data wherein the step of processing the plurality of n-bit image data further includes generating a plurality of m-pixel scaled image data, wherein each scaled image data comprises m pixels.

7. The method as in claim 6 wherein the step of generating the plurality of m-pixel scaled image data in the step of processing the plurality of n-pixel image data further includes using a greater-than-unity scaling ratio of m:n.

8. The method as in claim 7 further comprising the step of copying all the pixels from the n-pixel image data into the m-pixel scaled image data to form duplicate pixels.

9. The method as in claim 8 further comprising the step of generating a plurality of stretch pixels, whereby the stretch pixels and the duplicate pixels form the m-pixel scaled image data.

10. The method as in claim 9 further comprising the step of substantially evenly spacing out the plurality of stretch pixels among the plurality of duplicate pixels.

11. The method as in claim 10 wherein each of the plurality of stretch pixels is generated by using its corresponding neighbouring duplicate pixels.

12. The method as in claim 11, wherein each of the plurality of stretch pixels is generated with a display intensity value obtained by substantially averaging the display intensity values of its neighbouring duplicate pixels.

13. The method as in claim 12, wherein each of the plurality of stretch pixels is generated with a display intensity value copied from one of its neighbouring duplicate pixels.

14. The method as in claim 4 further comprising the step of using different possible values of the n-pixel image data in generating the plurality of table data.

15. The method as in claim 14 wherein each of the plurality of table data corresponds to a value of the n-pixel image data.

\* \* \* \* \*